US007693806B2

(12) United States Patent
Yih et al.

(10) Patent No.: US 7,693,806 B2
(45) Date of Patent: Apr. 6, 2010

(54) CLASSIFICATION USING A CASCADE APPROACH

(75) Inventors: Wen-tau Yih, Redmond, WA (US); Joshua T. Goodman, Redmond, WA (US); Geoffrey J. Hulten, Lynnwood, WA (US)

(73) Assignee: Microsoft Corporation, Redmond, WA (US)

( * ) Notice: Subject to any disclaimer, the term of this patent is extended or adjusted under 35 U.S.C. 154(b) by 524 days.

(21) Appl. No.: 11/766,434

(22) Filed: Jun. 21, 2007

(65) Prior Publication Data

US 2008/0319932 A1 Dec. 25, 2008

(51) Int. Cl.
G06F 15/18 (2006.01)
G06N 3/08 (2006.01)
(52) U.S. Cl. ...................................................... 706/25
(58) Field of Classification Search .................... 706/25
See application file for complete search history.

(56) References Cited

U.S. PATENT DOCUMENTS

| | | | | |
|---|---|---|---|---|
| 5,638,487 | A * | 6/1997 | Chigier | 704/253 |
| 5,698,354 | A * | 12/1997 | Ugai et al. | 430/45.54 |
| 5,933,519 | A * | 8/1999 | Lee et al. | 382/133 |
| 6,013,406 | A * | 1/2000 | Moriki et al. | 430/108.22 |
| 6,026,189 | A * | 2/2000 | Greenspan | 382/226 |
| 6,546,379 | B1 | 4/2003 | Hong et al. | |
| 6,823,323 | B2 * | 11/2004 | Forman et al. | 706/20 |
| 6,917,926 | B2 | 7/2005 | Chen et al. | |
| 7,099,505 | B2 | 8/2006 | Li et al. | |
| 7,099,510 | B2 | 8/2006 | Jones et al. | |
| 7,295,977 | B2 * | 11/2007 | Whitman et al. | 704/236 |
| 7,467,098 | B2 * | 12/2008 | Razumov | 705/26 |
| 7,505,621 | B1 * | 3/2009 | Agrawal et al. | 382/159 |
| 7,554,980 | B1 * | 6/2009 | Yeh et al. | 370/392 |
| 2004/0186816 | A1 | 9/2004 | Lienhart et al. | |
| 2004/0260922 | A1 | 12/2004 | Goodman et al. | |
| 2005/0180627 | A1 | 8/2005 | Yang et al. | |
| 2006/0088207 | A1 | 4/2006 | Schneiderman | |

(Continued)

OTHER PUBLICATIONS

Classifying Foreground Pixels in Document Images Sarkar, P.; Saund, E.; Jing Lin; Document Analysis and Recognition, 2009. ICDAR '09. 10th International Conference on Jul. 26-29, 2009 pp. 641-645 Digital Object Identifier 10.1109/ICDAR.2009.252.*

(Continued)

*Primary Examiner*—Michael B Holmes
(74) *Attorney, Agent, or Firm*—Lee & Hayes, PLLC

(57) ABSTRACT

A system and method that facilitates and effectuates optimizing a classifier for greater performance in a specific region of classification that is of interest, such as a low false positive rate or a low false negative rate. A two-stage classification model can be trained and employed, where the first stage classification is optimized over the entire classification region and the second stage classifier is optimized for the specific region of interest. During training the entire set of training data is employed by a first stage classifier. Only data that is classified by the first stage classifier or by cross validation to fall within a region of interest is used to train the second stage classifier. During classification, data that is classified within the region of interest by the first classification is given the first stage classifier's classification value, otherwise the classification value for the instance of data from the second stage classifier is used.

20 Claims, 13 Drawing Sheets

U.S. PATENT DOCUMENTS

2006/0112026 A1 5/2006 Graf et al.
2006/0112038 A1 5/2006 Luo

OTHER PUBLICATIONS

Respiratory disease diagnosis using lung sounds Kahya, Y.P.; Guler, E.C.; Sahin, S.; Engineering in Medicine and Biology Society, 1997. Proceedings of the 19th Annual International Conference of the IEEE vol. 5, Oct.30-Nov. 2, 1997 pp. 2051-2053 vol. 5 Digital Object Identifier 10.1109/IEMBS.1997.758751.*

Breast Cancer Diagnosis and Classification in MR-images using Multi-stage classifier Ardekani, R.D.; Torabi, M.; Fatemizadeh, E.; Biomedical and Pharmaceutical Engineering, 2006. ICBPE 2006. International Conference on 2006 pp. 84-87 Digital Object Identifier 10.1109/ICBPE.2006.348559.*

Multi-stage classification Senator, T.E.; Data Mining, Fifth IEEE International Conference on Nov. 27-30, 2005 pp. 8 pp. Digital Object Identifier 10.1109/ICDM.2005.102.*

A multi-stage classifier based algorithm of pedestrian detection in night with a near infrared camera in a moving car Hui Sun; Chengying Hua; Yupin Luo; Image and Graphics, 2004. Proceedings. Third International Conference on Dec. 18-20, 2004 pp. 120-123 Digital Object Identifier 10.1109/ICIG.2004.11.*

Car license plate feature extraction and recognition based on multi-stage classifier Pu Han; Wei Han; Dong-Feng Wang; Yong-Jie Zhai; Machine Learning and Cybernetics, 2003 International Conference on vol. 1, Nov. 2-5, 2003 pp. 128-132 vol. 1.*

Graf, et al. "Parallel Support Vector Machines: The Cascade SVM," http://leon.bottou.org/publications/pdf/nips-2004c.pdf, NEC Laboratories, last accessed Mar. 14, 2007, 8 pages, Princeton, NJ.

Athitsos, et al. "Efficient Nearest Neighbor Classification Using a Cascade of Approximate," Boston University Computer Science Tech. Report No. 2005-009, Apr. 6, 2005, 8 pages.

Viola, et al. "Rapid Object Detection using a Boosted Cascade of Simple Features," Accepted Conference on Computer Vision and Pattern Recognition, 2001, http://www.ece.northwestern.edu/~yingwu/teaching/ECE432/Reading/Viola_CVPR01.pdf, last accessed Mar. 14, 2007, 9 pages.

Massey, et al. "Learning Spam: Simple Techniques for Freely-Available Software," Proceedings of the 2003 Usenix Technical Conference, Freenix Track, http://web.cecs.pdx.edu/~thomure/learning04massey.pdf, last accessed Mar. 14, 2007, 14 pages.

* cited by examiner

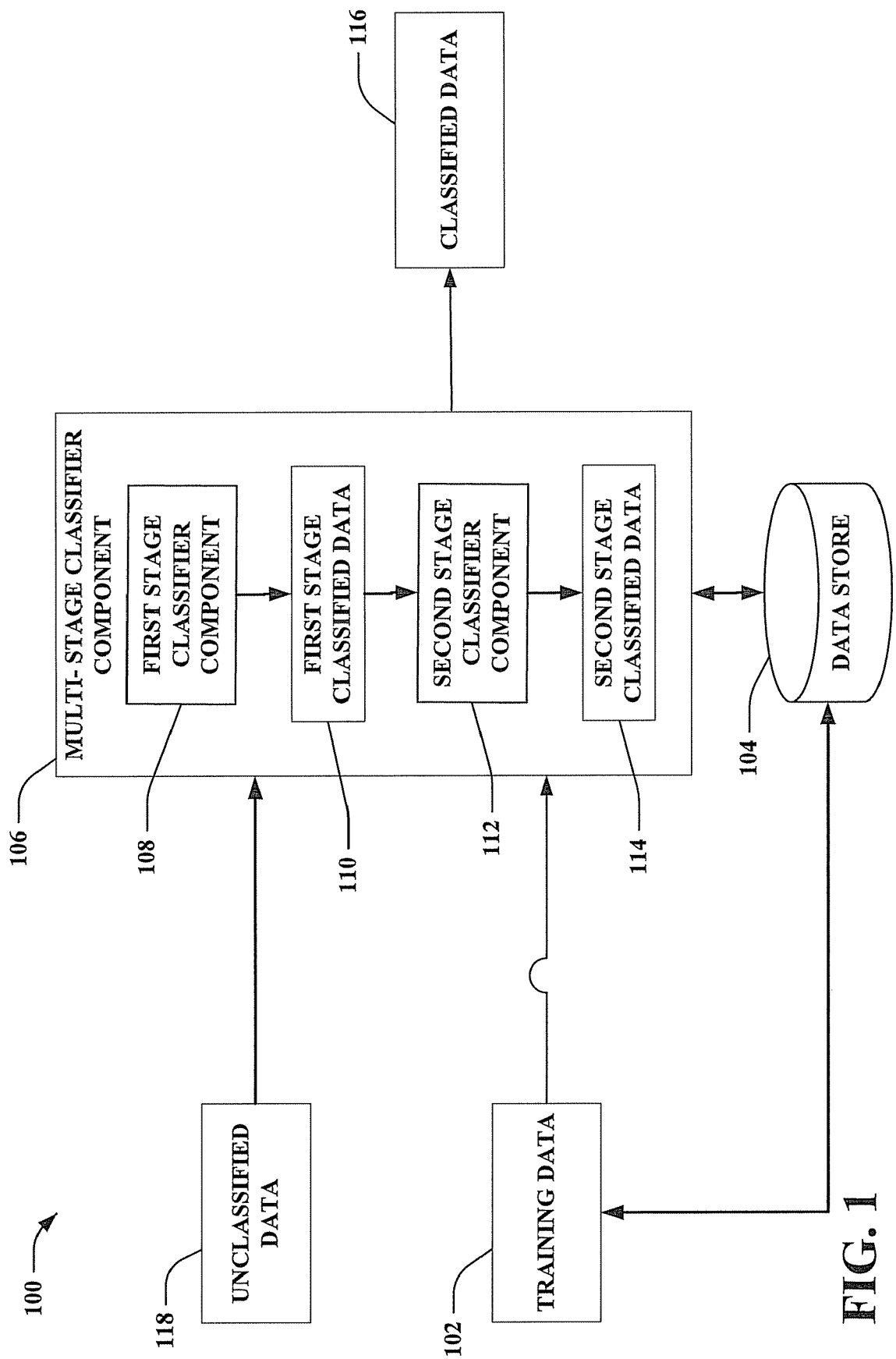

CLASSIFICATION USING A CASCADE APPROACH

BACKGROUND

There are many applications for automatic classification of items such as e-mail, documents, images, and recordings. To address this need, a plethora of classifiers have been developed based on probabilistic dependency models learned from training data. Some examples of classifiers based on probabilistic dependency models include logistic regression models, decision trees models, support vector machines, Naive Bayes models, and neural networks.

Logistic regression models are also called maximum entropy models and are equivalent to a certain kind of single layer neural network. In particular, logistic regression models are of the form:

$$P_{\overline{w}}(Y=1\mid \overline{x}) = \frac{\exp(\overline{w}\cdot \overline{x})}{1+\exp(\overline{w}\cdot \overline{x})} \quad \text{Equation (1)}$$

In this equation, Y is the variable being predicted (in this case, Y takes the values 0 or 1, with 1 meaning that a message is positive, for example as classified as spam), $\overline{w}$ represents a set of weights, $\overline{x}$ represents an instance of input data, such as the words in an e-mail message; for instance, it can be a vector of 1's and 0's, with a 1 indicating that a particular word is present in the message. The weights indicate the relative weights for each word. These weights are typically learned in such a way as to maximize the probability of the training data as follows:

$$\arg\max_{\overline{w}} \prod_{i=1}^{n} P_{\overline{w}}(Y=y_i\mid \overline{x}_i)$$

That is, a set of weights $\overline{w}$ is identified that make the training data as likely as possible: for example they do as good a job as possible of predicting that each spam message is spam, and each good message is good. In practice, these weights are almost always regularized, for example with a Gaussian prior. It is assumed that the average weight should be 0, and that very large weights are unlikely. Letting N(w; 0, $\sigma^2$) represent the probability of a variable w being generated by a Gaussian distribution with mean 0 and variance $\sigma^2$, the actual formula maximized is:

$$\arg\max_{\overline{w}} \prod_{i=1}^{n} P_{\overline{w}}(Y=y_i\mid \overline{x}_i) \cdot \prod_{j=1}^{k} N(w_i; 0, \sigma^2)$$

This means that weights $\overline{w}$ are identified that overall maximize the probability of the training data, and the probability of the weights $\overline{w}$.

A training algorithm that can be used is Sequential Conditional Generalized Iterative Scaling (SCGIS), although because logistic regression models have a global optimum, the choice of learning algorithm is typically of little importance, except for training speed considerations.

Naive Bayes is a well known algorithm, especially for e-mail spam filtering. Naive Bayes computes the probability of an e-mail message as a whole: given all possible good messages, what is the probability that this particular message was generated; given all possible spam messages, what is the probability that this particular message was generated. There is an assumption of conditional independence, that all words in the message were generated independently of the others, given the label (i.e., spam or good) of the message. Naive Bayes is concerned with accurately estimating the probability of all messages, and there is no focus on any particular region of a Receiver Operating Characteristic (ROC) curve.

Traditionally classifiers have been trained using a sample set of data representative of the items being classified and are optimized to meet certain accuracy and/or entropy requirements equally across the entire region of classification. Accuracy can be optimized for equal costs for false positives and false negatives and entropy can be optimized for estimating probabilities correctly across the entire range of probabilities. However, there are many cases where the classifier must meet higher requirements for one or more particular regions of the classification, such as in the low false-positive or in the low false-negative region. An application threshold would normally be set to achieve the desired requirement, such as a low false positive rate for good mail being classified as spam in an e-mail application. A classifier that has been optimized for equal performance across the entire region of classification can have a reduced effectiveness when using a threshold in classifying data that falls within a particular region of interest.

There is a need to provide a classifier that has been optimized for a specific area of the classification region that is of interest. For example, a user that has enabled a spam filter in their e-mail application does not want their good messages to end up in a spam folder, even at the expense of receiving a few spam messages in their inbox. Therefore, the spam filter must be optimized to have a low false positive rate for identifying good messages as spam. In another example, a lab that employs classifiers to identify cancerous cells in a sample is more concerned with letting a few negative samples to be identified as positive over missing a positive identification of a cancerous sample. The cost of missing a positive sample can be significant in terms of lost treatment time for the patient, where a negative sample that is incorrectly identified as positive will likely be caught in further testing. In this case, the classifier must be optimized to have a low false negative rate for classifying positive samples as negative.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

In accordance with one or more aspects and corresponding disclosure thereof, various features are described in connection with provide a classifier that has been optimized for greater performance in one or more specific regions of classification that are of interest. In an aspect, a multi-stage classification model can be employed that comprises a plurality of classification stages. During training the entire set of training data is employed by a first stage classifier. Only data that is classified by the first stage classifier to fall within one or more regions of interest is used to train the second stage classifier. In this way, the second stage classifier is optimized to classify data that falls within the regions of interest.

In another aspect, a utility classifier is described to provide optimized classification in one or more particular regions of interest. Training data is weighted to favor the regions of interest. In one aspect, training data that is within the region of interest is duplicated a number of times dependent upon how much this region is to be weighted, while training data that is not within the region of interest is not duplicated or duplicated by a different value. To avoid having to generate artificial examples from duplication, one or more updates, counts, and/or probabilities within the classifier associated with data from the region of interest can be multiplied by a weighting value. Additionally, regularization can be employed the classifier.

Another aspect involves combining multi-stage classification with utility classification. One or more classification stages of a multi-stage classifier can be a utility classifier.

In one aspect, the invention is embodied in an e-mail spam filtering system where the classifier has been optimized to have a low false positive rate for identifying good messages as spam. Other embodiments for spam filtering can include, but are not limited to: an instant messaging service, where the classifier has been optimized to have a low false positive rate for classifying good instant messages as spam; a telemarketing screening service, where the classifier is optimized to have a low false positive rate for identifying a phone call that is a non-telemarketing call as a telemarketing call; a device display pop-up blocker that is optimized to have a low false positive rate for identifying relevant pop-ups, such as warnings, reminders, application windows, as spam pop-ups; and an audio stream filter for classifying music from advertisements and/or talk, that can be optimized for a low false positive rate for identifying music as advertising and/or talk if a user wants to avoid hearing ads and talk but doesn't want a song to be cut off in the middle. In another embodiment, a cancer screening system is optimized to have a low false negative rate for positive samples. Another embodiment is a credit card fraud detection system that is optimized to have a low false positive rate for identifying good transactions as fraudulent ones in order to prevent inconvenience to the credit card customer. A customer who was frequently being denied when trying to use a credit card may stop using the card. In another fraud detection system, a credit card company may have a fraud detection system that is set to a low false negative rate for identifying patterns of charges across many accounts as fraud that are not actually fraudulent. Detecting macro fraudulent patterns can assist security in focusing their investigations and prevent organized credit card fraud. The invention can also be embodied in an intrusion detection system, such as in a high security environment. For example, a nuclear power plant employs biometrics to identify people that are authorized to enter the facility. It is important to keep unauthorized people out of the facility. The biometric system can be optimized to have a low false negative rate for identifying unauthorized users as authorized. Along similar lines a high security computing environment may be optimized for a low false negative for classifying an intruder (login, connection, download, application) as legitimate. It should be appreciated that the above embodiments are exemplary and are not intended to limit the scope of the invention to particular scenarios, operating conditions or applications. The invention is applicable to any classifier where there is need to optimize for a specific region of interest. Furthermore, the data being classified can include any of, but are not limited to, domains, web pages, Uniform Resource Locators(URL), text, images, videos, audio, documents, files, directories, data structures and the like.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 1 illustrates an exemplary general block diagram system employing a multi-stage classifier for classification of data.

DETAILED DESCRIPTION

Figure 2A:
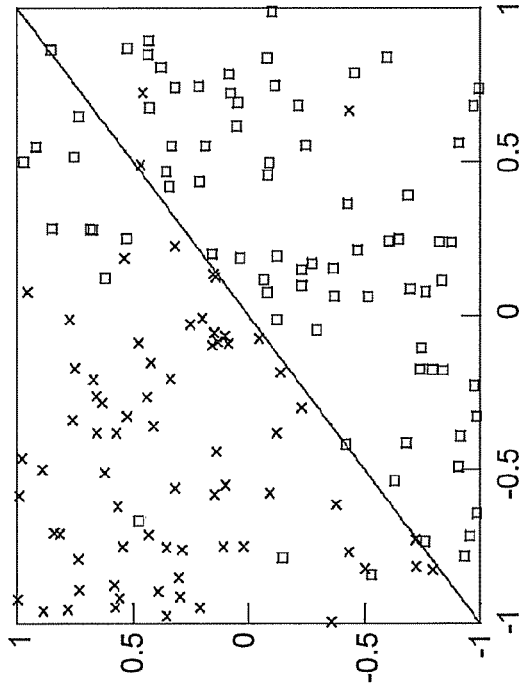
FIG. 2A illustrates an exemplary training data set when viewed in a two-dimensional representation.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

Throughout the discussion below, experimental results based on exemplary training sets of data are presented to further support or illustrate various aspects of the subject application. It should be appreciated and understood that such experiments are not intended to limit the scope of the systems and methods described herein to particular scenarios, operating conditions or applications but are provided as examples. Moreover, the subject application can be employed with respect to any type of classification performed on the Internet, on a remote or local server, storage facility, or on any computing device or network.

Referring to FIG. 1, there is illustrated an exemplary general block diagram system 100 employing a multi-stage classifier for classification of data. Although a spam e-mail filtering system is being used in certain instances as an example to discuss various aspects of the invention, it is to be understood that the invention is applicable to any type of data classification system. System 100 includes multi-stage classifier component 106 that has been trained using training data 102 from data store 104 to classify unclassified data 118 into classified data 116. Multi-stage classifier component 106 includes first stage classifier component 108 and includes second stage classifier component 112 that employs some of the first stage classified data 110 for training and/or classification. First stage classifier component 108 is trained using training data 102. First stage classifier component 108 produces first stage classified data 110 from training data 102 and/or unclassified data 118. Second stage classifier component 112 is trained using a subset of first stage classified data 110 from training data 102. Second stage classifier component 112 produces second stage classified data 114 from a subset of first stage classified data 110.

Typically, probabilistic classifiers attempt to maximize the probability across all of the training data. However, for e-mail spam filtering, it is important to produce a low false positive rate for classifying good e-mails as spam e-mails. One way to focus on this low false positive region is to explicitly select data for training that is in the region of interest. It is to be understood that the region of interest is not limited to being the low false positive region. Alternate regions, such as the low false negative region, can be more important depending on the type of data being classified. Additionally, more than one region can be of interest when there are more than two classes. When training data is selected that is characteristic of the data that is most important, then the classifier will be well optimized for this particular data.

For example, good mail that is easy to classify as good e-mail is not important in training second stage classifier component 112, because the first stage classifier component 108 performs well in identifying these e-mails. Also spam e-mail that is very difficult to classify as spam is not important in training second stage classifier component 112—given a low false positive threshold $\theta$ setting, the multi-stage classifier component 106 is not likely to classify those e-mails as spam. Both types of e-mails can be discarded in training the second stage classifier component 112, leaving moderately hard and easy to classify spam e-mails, and moderately hard and very hard to classify good e-mail. The second stage classifier component 112 can be trained to explicitly distinguish between those messages: these are the messages that will be important with a low false positive rate.

Multi-stage classifier component 106 receives training data 102. First stage classifier component 108 includes first stage classifier $p_a$ that is trained using all of the training data 102. The first stage classifier component 110 is then used to classify the training data 102 with a defined threshold $\theta$ to produce first stage classified data 110. The threshold $\theta$ is the accuracy and/or entropy that is desired, and can be user or system defined. Any appropriate threshold $\theta$ can be selected to coincide with the region of interest. For example, a false positive rate of 4% can be selected. Any instance of data within the training data 102 that is classified by the first stage classifier component 108 in the first stage classified data 110 as having a value less than the threshold $\theta$ of being positive is ignored. Instances of data within training data 102 that are classified by the first stage classifier component 110 in the first stage classified data 110 as having a value equal to or above the threshold $\theta$ of being positive are employed to train the second stage classifier component 112. The second stage classifier component 112 includes second stage classifier $p_b$ that is trained to be optimized on the region of interest using the instances of data equal to or above the threshold $\theta$ in the first stage classified data 110. The classifiers in the first and second stages can be the same or different classifiers, and can be any classifier that returns probabilities or scores, for example logistic regression or Naive Bayes. The classifiers in the first and second stage can use identical features of the data for classification.

Optionally, more than one region can be of interest when there are more than two classes. In this case, a threshold can be defined for each class. Training data can then be selected for use in training the second stage classifier by employing all of the thresholds. The second stage classifier can have a single classifier to accommodate all of the regions of interest. Alternatively, the second stage classifier can include a plurality of classifiers, such as one classifier for each region of interest that is specifically trained for its respective region of interest using training data that is filtered using the region of interest's defined threshold.

Additionally, more than two stages can be included in the multi-stage classifier. In this case, the second stage is trained using data that has been filtered using the first stage classifier using defined thresholds. The third stage classifier is trained using training data, for example the set of training data or the subset used to train the second stage classifier, that has been filtered using the second stage classifier using defined thresholds. This is repeated for each subsequent stage using training data that has been filtered using the previous stage.

Figure 2B:
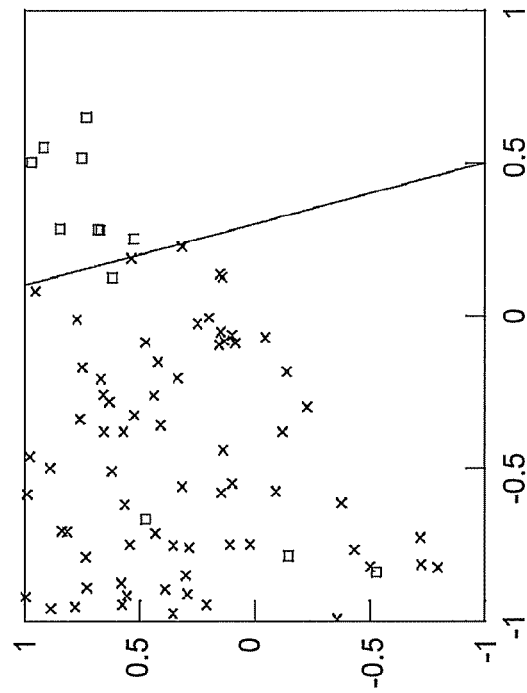
FIG. 2B illustrates a first stage classifier that is learned.
Figure 2C:
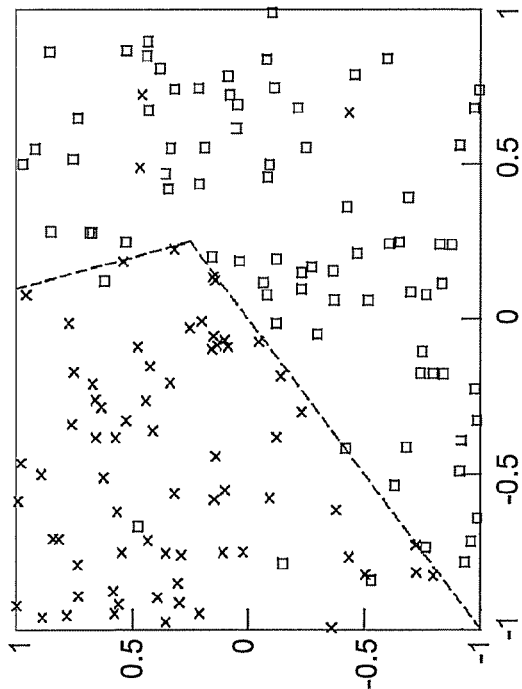
FIG. 2C illustrates the training data employed by the second stage classifier when training data that is classified below the threshold by the first stage classifier is ignored.
Figure 2D:
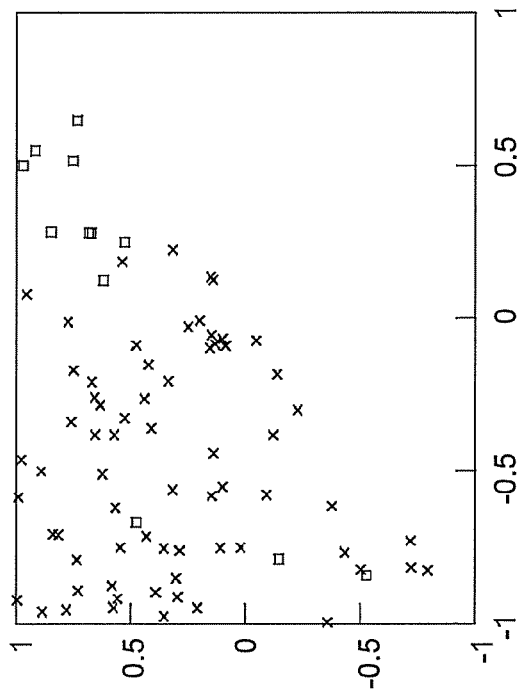
FIG. 2D illustrates the second-stage classifier that is learned using the training data from FIG. 2C.

Turning to FIGS. 2A-2D, are illustrated an exemplary set of data for training a multi-stage classifier. A multi-stage classifier is particularly suitable to data that is not already well modeled by the first stage classifier. It is especially effective when different regions of the data have different relative distributions. For instance, there are many examples of words that are more or less indicative of spam in the low false positive region than they are across the training corpus as a whole. FIG. 2A illustrates an exemplary training data set when viewed in a two-dimensional representation where the x-axis and y-axis represent the values of the two features in the examples, a square □ is a positive example (spam) and an x is a negative example (not spam). Notice that the data is almost, but not quite linearly separable. FIG. 2B shows the first stage classifier that is learned. In the illustration, a threshold of 50% is used by the first stage classifier, but in practice, any threshold can be picked. Depending on the threshold picked, the classifier will optimize on a different type of data, and thus optimize for a different false positive rate. FIG. 2C illustrates the training data employed by the second stage classifier when training data that is classified below the threshold by the first stage classifier is ignored. In other words using the spam e-mail filtering example, eliminating all of the easy to classify good e-mails (□ squares in the bottom right) and hard to classify spam e-mails (x's in the bottom right) by picking a threshold for the first-stage classifier. FIG. 2D illustrates the second-stage classifier that is learned using the training data from FIG. 2C.

In some cases, the first stage classifier that is trained performs very well in classifying the training data at the defined threshold $\theta$. In these cases, very little data would be selected to train the second stage classifier when the first classifier is used to classify the training data. Turning back to FIG. 1, cross validation can be employed when this condition arises.

Cross validation involves splitting T the training data 102 into n chunks, where n is an integer, i=1 ... n. First stage classifier component 110 will then comprise n+1 first stage classifiers $p_1 ... p_n, p_a$. First stage classifier $p_i$ is trained using all chunks of training data except for $T_i$. For example, first stage classifier $p_2$ is training using training data chunks, $T_1, T_3 ... T_n$. First stage classifier $p_i$ is then employed to classify each instance t of data within training data chunk $T_i$ using a defined threshold θ to produce second stage training data U. Instances t of training data that is classified by each first stage classifier $p_i$ as having a value that is equal to or exceeds the threshold θ is added to second stage training data U. The training, classifying, and adding to second stage training data U are repeated for each first stage classifier $p_1 ... p_n$. This identifies second stage training data U that is within the region of interest. First stage classifier $p_a$ is trained using all of the training data 102. The entire set of second stage training data U is employed as training data by the second stage classifier component 112 to train the second stage classifier $p_b$. Algorithm 1 below illustrates training of a multi-stage classifier using cross validation as described above.

---

Algorithm 1. Training a multi-stage classifier with cross validation
---
INPUT: training set T, threshold θ
Split T into n equal sets, $T_1, T_2, ..., T_n$
for i = 1 to n do
   Train a classifier $p_i$ using all data T except $T_i$
   for all t ∈ $T_i$ do
     if $p_i(t) \geq θ$ then
       U = U ∪ t
     end if
   end for
end for
Train a classifier $p_a$ using T
Train a classifier $p_b$ using U
Return $p_a, p_b$

---

After the two stage classifier component 106 has been trained, with or without cross validation, as described above, two stage classifier component 106 can be employed to classify unclassified data 118. Two stage classifier component 106 receives unclassified data 118. The first stage classifier component 108 is employed to classify each instance of data within the unclassified data 118 according to a defined threshold θ to produce first stage classified data 110. Each instance of data in the first stage classified data 110 that has been classified with a value below the threshold θ is made part of the set of classified data 116. Each instance of data in the first stage classified data 110 that has been classified with a value equal to or above the threshold θ, is classified by the second stage classifier component to produce second stage classified data 114. Second stage classified data 114 is made part of the set of classified data 116.

---

Algorithm 2. Multi-stage classification of an instance of data
---
INPUT: classifiers $p_a$ and $p_b$, threshold θ, instance of data t
if $p_a(t) < θ$ then
   return $p_a(t)$
else
   Return $p_b(t)$
end if

---

Algorithm 2 illustrates an algorithm for classification of an unclassified instance of data using a multi-stage classifier. This algorithm has a theoretical justification for combining the first and second stage classifiers into a multi-stage classifier as depicted. Experimentation has further validated the effectiveness of this algorithm.

When there are more than two stages, a defined threshold at each stage determines if the classification value at that stage should be used or if the instance of data should be classified by the next stage.

There are two cases that need to be considered. In the first case, an instance of data with features $\bar{x}$ has value $p_a(\bar{x}) < θ$, therefore $p_a(\bar{x})$ is our best estimate of its value and this is the classification value. However, in the case when $p_a(\bar{x}) \geq θ$, what is the best classification estimate?

Random variable A represents the event when the instance of data is above the threshold based on the first-stage classifier.

$$A \equiv [p_a(\bar{x}) \geq θ]$$

For an instance of data with features $\bar{x}$ that is classified as equal to or above the threshold by the first-stage classifier $p_a$, event A is true (i.e., A=1).

$$P(y = 1 \mid \bar{x}) = \frac{P(y = 1, \bar{x})}{P(\bar{x})}$$

$$= \frac{P(y = 1, \bar{x}, A)}{P(\bar{x})} \quad \text{Equation (2)}$$

$$= \frac{P(y = 1, \bar{x}, A)}{P(\bar{x}) \cdot P(A \mid \bar{x})} \quad \text{Equation (3)}$$

$$= \frac{P(y = 1, \bar{x}, A)}{P(\bar{x}, A)}$$

$$= P(y = 1 \mid \bar{x}, A)$$

Equation (2) is true because A is always true for an instance of data that is classified as equal to or above the threshold by the first stage classifier. Equation (3) is true because A is true given that the instance of data has been classified as equal to or above the threshold by the first stage classifier.

Figure 3:
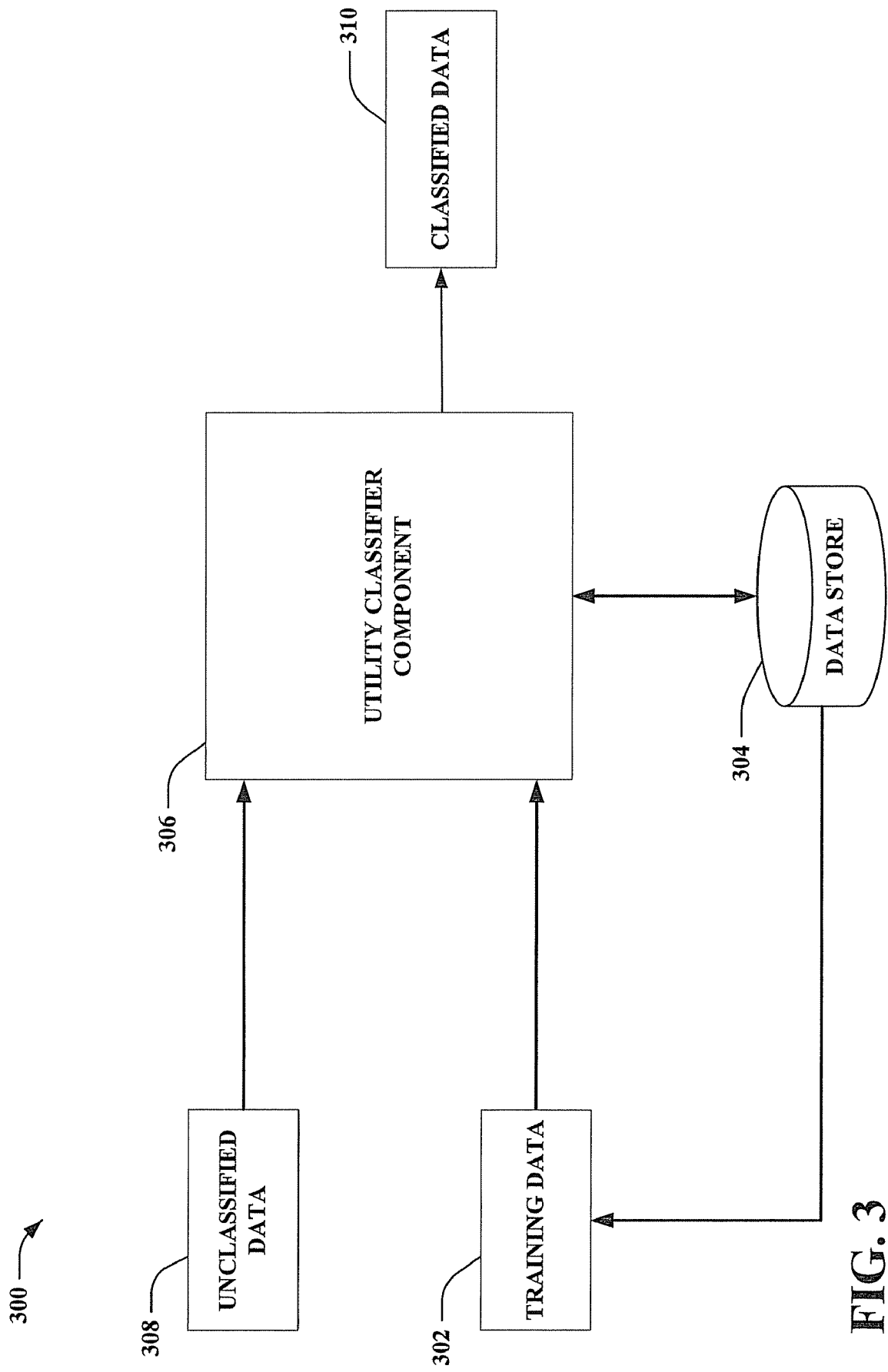
FIG. 3 illustrates a general block diagram system employing a utility classifier for classification of data.

Now referring to FIG. 3, there is illustrated a general block diagram system 300 employing a utility classifier for classification of data. System 300 includes utility classifier component 306 that has been trained using training data 302 from data store 304 to classify unclassified data 308 into classified data 310.

To focus on the particular classification region of interest, instances within the training data 302 can be treated differently. For example, the cost of a false positive classification could be higher than the cost of a false negative classification. In the spam e-mail filter example, this is similar to classifying an e-mail as good e-mail if the filter is not sure about whether an email is spam or not.

The typical way to bias probabilistic classifiers is to use a threshold. For instance in the spam e-mail filter example, if not receiving good mail has utility value $u_n$, and receiving spam has utility value $u_p$, then utility can be maximized by computing:

$$u_n \cdot P(Y=0 \mid \bar{x}) > u_p \cdot P(Y=1 \mid \bar{x})$$

$$u_n \cdot P(Y=0 \mid \bar{x}) > u_p \cdot (1 - P(Y=0 \mid \bar{x}))$$

$$(u_n + u_p) \cdot P(Y=0 \mid \bar{x}) > u_p$$

$$P(Y=0 \mid \bar{x}) > u_p / (u_n + u_p)$$

From utility theory, an appropriate threshold can be computed, assuming the model is well calibrated. For models like Naive Bayes where the calibration is particularly imperfect, a threshold can be set empirically by examining classified data.

Utility classifier component 306 receives training data 302. Utility classifier component 302 incorporates utility by biasing training data 302 with an assignment of a utility value u to each instance of data within training data 302. Utility classifier component 302 is trained using the biased training data 302. For example, a utility value $u_n$ of 10 can be assigned to negative examples (good mail) and a utility value $u_p$ of 1 to positive examples (spam). In one aspect, each negative instance of training data can then be duplicated by utility classifier component 306 a number of times according to the utility value assigned. In the example above, each negative instance of data is duplicated 10 times to form a new set of training data 302 that is biased in favor of the negative instances of data by 10 times. Algorithm 3 illustrates this concept. Additionally, when there are more than two classes, each class can be assigned a utility value and instances of training data that fall within a class can be duplicated by the number assigned to the their respective class.

---

Algorithm 3. Training a utility classifier

INPUT: training set $T_r$, with utility values $u_p$, $u_n$
T ← φ
for all t ∈ $T_r$ do
  if class(t) = 1 then
    for i = 1 to $u_p$ do
      add example t to T
    end for
  else
    for i = 1 to $u_n$ do
      add example t to T
    end for
  end if
end for
Train a classifier p using T

---

In another aspect, there are often modifications in the base learning algorithm that can be implemented in the utility classifier component 306 to avoid generating artificial examples as described above in Algorithm 3. For example, when training a logistic regression classifier using gradient descent, updates can simply be multiplied by the corresponding class's utility value. When training logistic regression using SCGIS, which examines various counts and expected probabilities, the counts and/or probabilities can be multiplied by the utility value for respective classes at appropriate places. For Naive Bayes, the training process, which just uses frequency counting, does not need to be changed. The feature frequencies can be corrected to account for utility by multiplying the feature frequencies by the corresponding utility values.

Training with utility can have two effects; the first is to bias the classifier, independent of regularization; the second is a regularization effect.

One important advantage of ROC analysis is that it only depends on the order of the assignments. Any monotonic transformation of the score function will not affect the result. Therefore, ignoring regularization issues, it was commonly thought by those skilled in the art that training with utility simply changes the prior (a monotonic transformation), and has no impact on the ROC curve.

Figure 4:
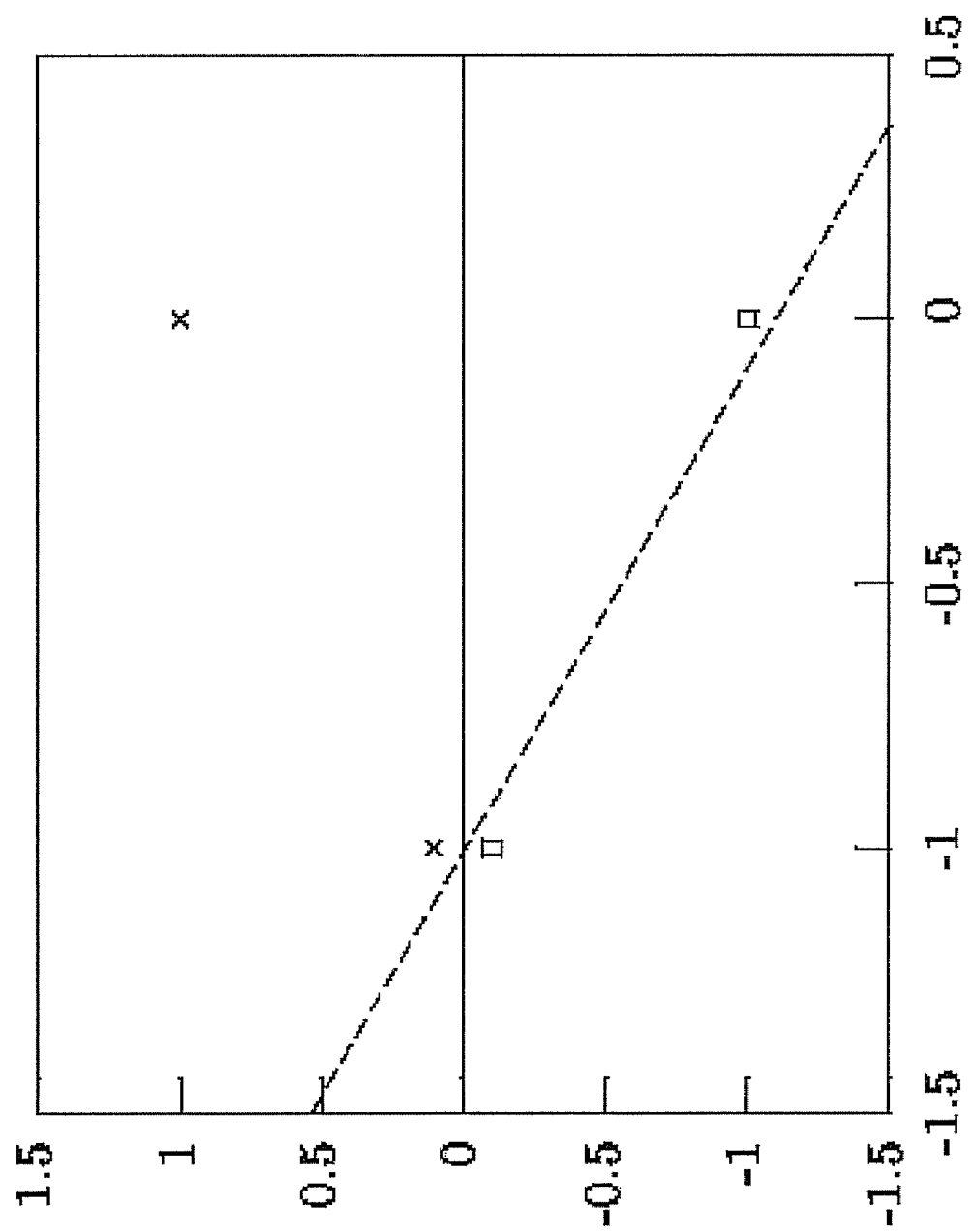
FIG. 4 illustrates the effect of utility training on a logistic regression classifier.

For Naive Bayes, this intuition is correct when regularization (e.g. a Dirichlet prior) is not applied. This is because with duplicated examples, the estimated conditional probability $P(\bar{x}|Y)$ will remain the same. For logistic regression, it turns out that the learned distribution is actually changed. A simple example, as shown in FIG. 4 illustrates how this can be the case where the x-axis and y-axis represent the values of the two features in the examples, a square □ is a positive example and an x is a negative example. The horizontal line in the figure illustrates the logistic regression classifier that is learned when the positive and negative utilities are equal. The diagonal line illustrates the classifier learned when a much larger utility is placed on the negative examples. As can be seen, utility values can actually cause a rotation in the learned classifier, and rotations (as opposed to shifts) lead to different ROC curves.

In addition, for both Naive Bayes and logistic regression, there is an effect on the regularization. For example, with Naive Bayes where a word A occurs 0 times in good mail, and a word B occurs once in good mail, in a corpus with 10 good messages, and assume plus-one regularization. In this case, we get $P(A|y=0)=1/11$ and $P(B|y=0)=2/11$: an occurrence of the word doubles the probability of being good. If the corpus is weighted with 10 times as much weight on good mail, the values become $P(A|y=0)=1/101$ and $P(B|y=0)=11/101$: an occurrence of the word increases the relative probability by a factor of 11. The utility weighting thus makes the good estimator much more sensitive to the presence of words: a single good example of a word can substantially raise the impact that the word has on the classification. Training with utility has a similar effect for regularized logistic regression, where the increased counts help overcome the prior disproportionately.

The strength of the regularization effect is unexpected. It has previously been argued by those skilled in the art that for Bayesian techniques, there would be little impact from training with utility:

However, these arguments ignored regularization effects. Training with utility actually leads to large improvements with Naive Bayes: the regularization effects are larger than what might be expected, especially in a domain like spam filtering.

The effect of training with utility can depend on the exact learning algorithm that is used. With logistic regression, we see both hyperplane rotation and shift, even without regularization effects, and we see additional effects because of regularization. For separable data trained with a hard margin SVM, utility weighting has no impact at all: there is no regularization, and since only the support vectors define the separating hyperplane, having more identical support vectors will not change the hyperplane in the hard-margin case. For soft margin SVMs, training with utility has an impact both because of regularization, and because it can cause hyperplane rotation; but the kinds of examples that will cause a hyperplane to rotate for a soft-margin SVM are rarer than they are for logistic regression.

Utility classifier component 306, once trained can be employed to classify unclassified data 308 into classified data 310. Utility classifier component 306 receives unclassified data 310. Utility classifier component 306 classifies the unclassified data 308 and produces classified data 310.

Figure 5:
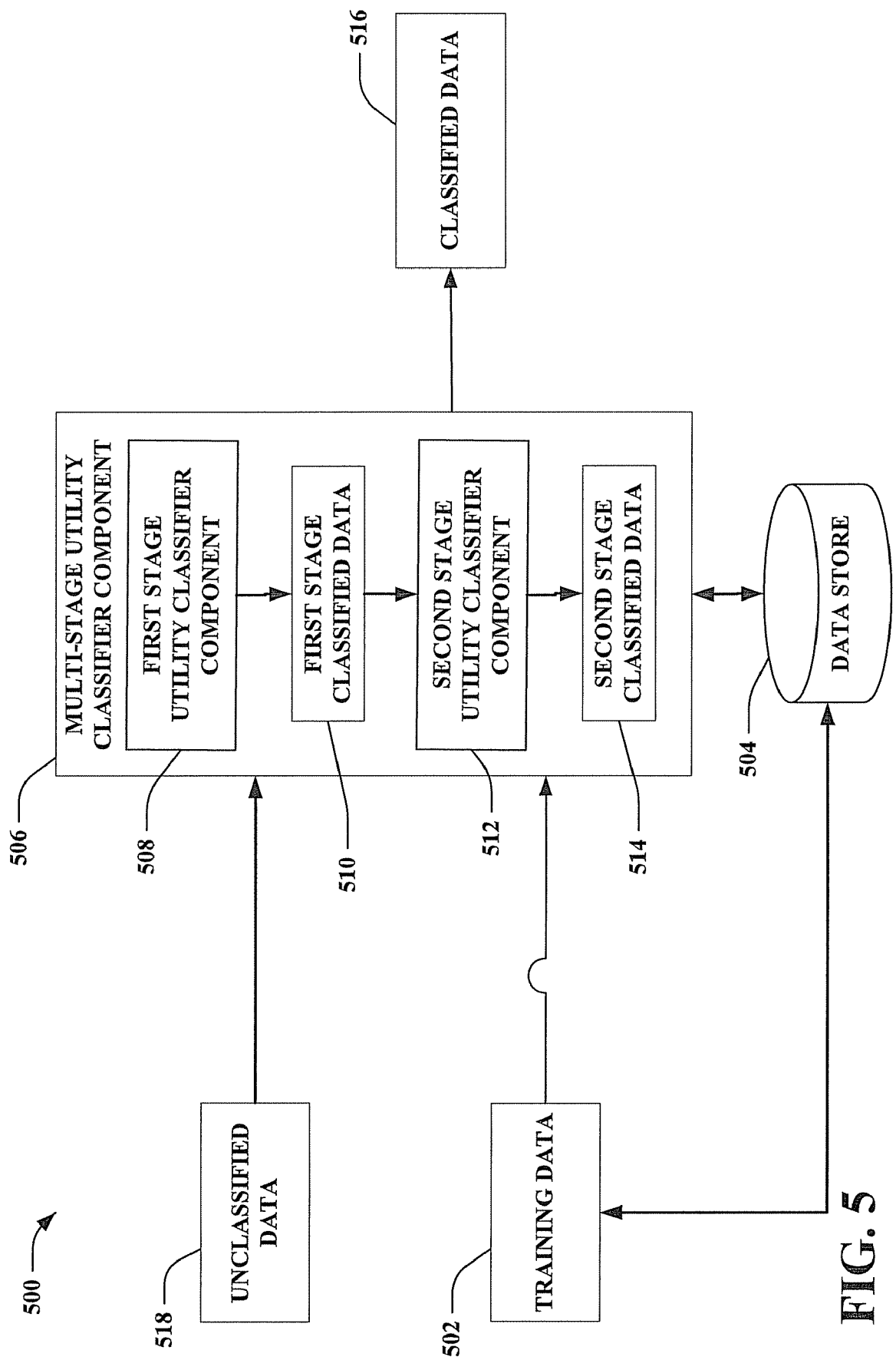
FIG. 5 illustrates a general block diagram system employing a multi-stage utility classifier for classification of data.

Referring to FIG. 5, there is illustrated a general block diagram system 500 employing a multi-stage utility classifier for classification of data. System 500 includes multi-stage utility classifier component 506 that has been trained using training data 502 from data store 504 to classify unclassified data 518 into classified data 516. Multi-stage utility classifier component 506 includes first stage utility classifier component 508, and includes second stage classifier component 512 that employs subsets of first stage classified data 510 for training and/or classification. First stage utility classifier component 508 is trained using training data 502 in the manner as described with respect to the utility classifier component 306 described in system 300. Second stage classifier component 512 uses a subset of first stage classified data 510 from training data 502 for training in the manner as described with respect to second stage classifier component 112 in system 100 and is trained in the manner as described with respect to the utility classifier component 306 described in system 300. If cross validation is employed, each first stage classifier in first stage utility classifier component 508 is trained with utility in the manner as described with respect to the utility classifier component 306 described in system 300.

Once multi-stage utility classifier component 506 has been trained, unclassified data 518 can be classified into classifier data 516 in the manner described with respect to multi-stage classifier component 106 in system 100.

In view of the exemplary systems shown and described supra, methodologies that can be implemented in accordance with the disclosed subject matter will be better appreciated with reference to the following flow charts. While for purposes of simplicity of explanation, the methodologies are shown and described as a series of blocks, it is to be understood and appreciated that the claimed subject matter is not limited by the order of the blocks, as some blocks can occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules can be combined and/or distributed as desired in various aspects.

Figure 6:
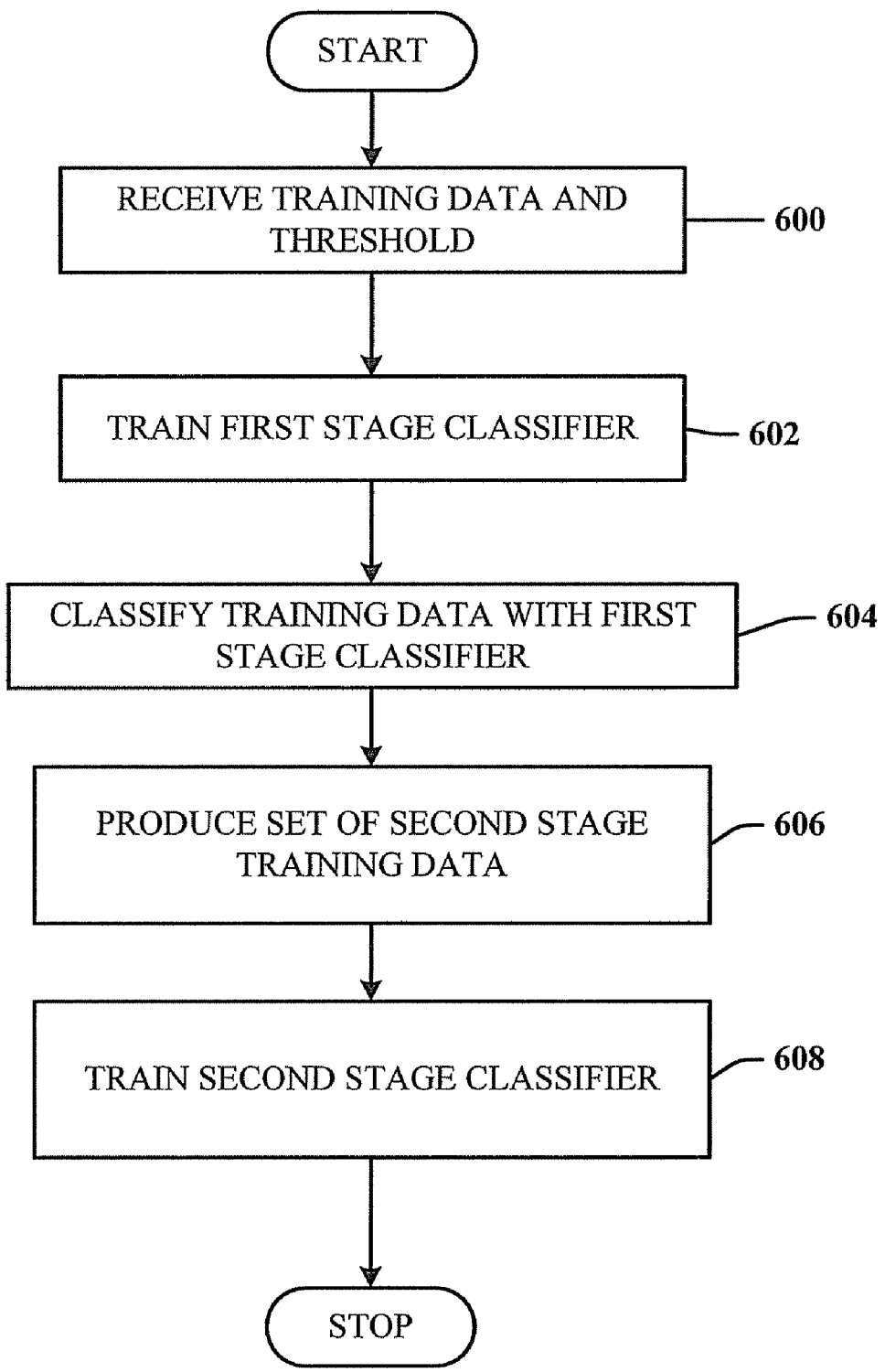
FIG. 6 illustrates a flow chart of one methodology for training a multi-stage classifier.

Referring now to FIG. 6, there is illustrated a flow chart of one methodology for training a multi-stage classifier. At 600, training data and threshold are received. The training data and/or threshold can, but is not limited to, being generated from an application, manually input, loaded from a data store, and/or received from another system locally or remotely. At 602, the training data is used to train a first stage classifier, optionally with utility. At 604, the trained first stage classifier is used to classify the training data into first stage classified training data. At 606, each instance of the first stage classified training data that is equal to or above a defined threshold is placed into a set of second stage training data. At 608, the second stage classifier is trained using the second stage training data. The classifiers in the first and second stages can be the same or different classifiers, and can be any classifier that returns probabilities or scores, for example logistic regression or Naive Bayes. The classifiers in the first and second stages can use identical features of the data for classification. The trained first stage and second stage classifiers, individually or in combination, can, but are not limited to, being saved to one or more data stores, displayed on one or more displays, transmitted to one or more local or remote systems, and/or executed by one or more processors on one or more systems.

Figure 7:
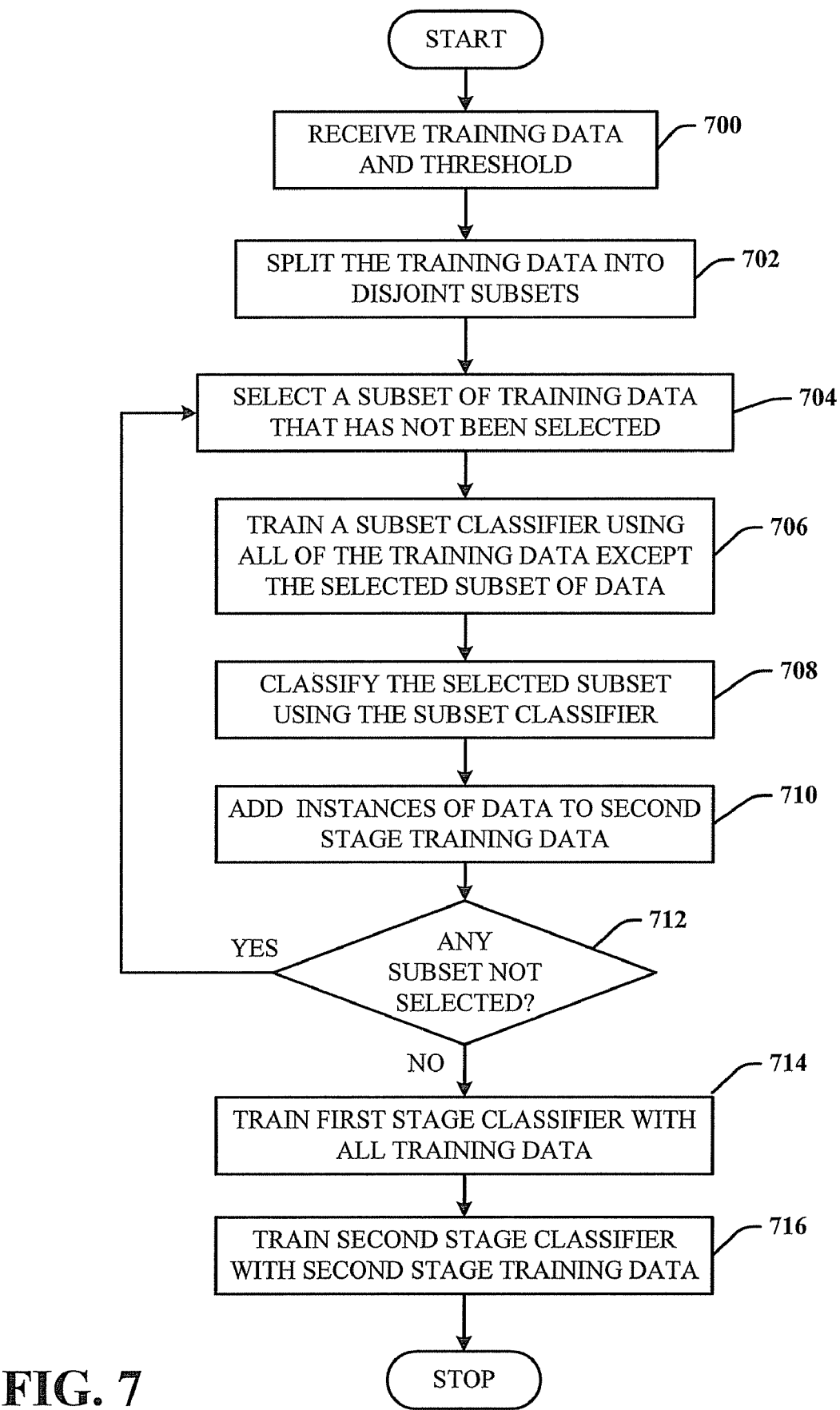
FIG. 7 illustrates a flow chart of one methodology for training a multi-stage classifier using cross validation.

Referring to FIG. 7, there is illustrated a flow chart of one methodology for training a multi-stage classifier using cross validation. At 700 training data and threshold are received. The training data and/or threshold can, but is not limited to, being generated from an application, manually input, loaded from a data store, and/or received from another system locally or remotely. At 702 the training data is split into a number of disjoint subsets, for example, 10 subsets. At 704, one subset of data is selected that has not been previously selected. At 706, a subset classifier is trained using all of the training data except for the subset of data selected. At 708, the subset classifier that was trained not using the selected subset is employed to classify the data in the selected subset of data. At 710, any instance of data from the selected subset that has been classified with a value above a defined threshold is placed in a set of second stage training data. At 712, a determination is made; if there is any subset of data that has not been selected, then proceed to 704, otherwise proceed to 714. At 714, a first stage classifier is trained using all of the training data that was received at 700. At 716, a second stage classifier is trained using the set of second stage training data. The subset, first stage, and second stage classifiers can be the same or different classifiers, and can be any classifier that returns probabilities or scores. The classifiers can use identical features of the data for classification. The trained classifiers, individually or in combination, can, but are not limited to, being saved to one or more data stores, displayed on one or more displays, transmitted to one or more local or remote systems, and/or executed by one or more processors on one or more systems.

Figure 8:
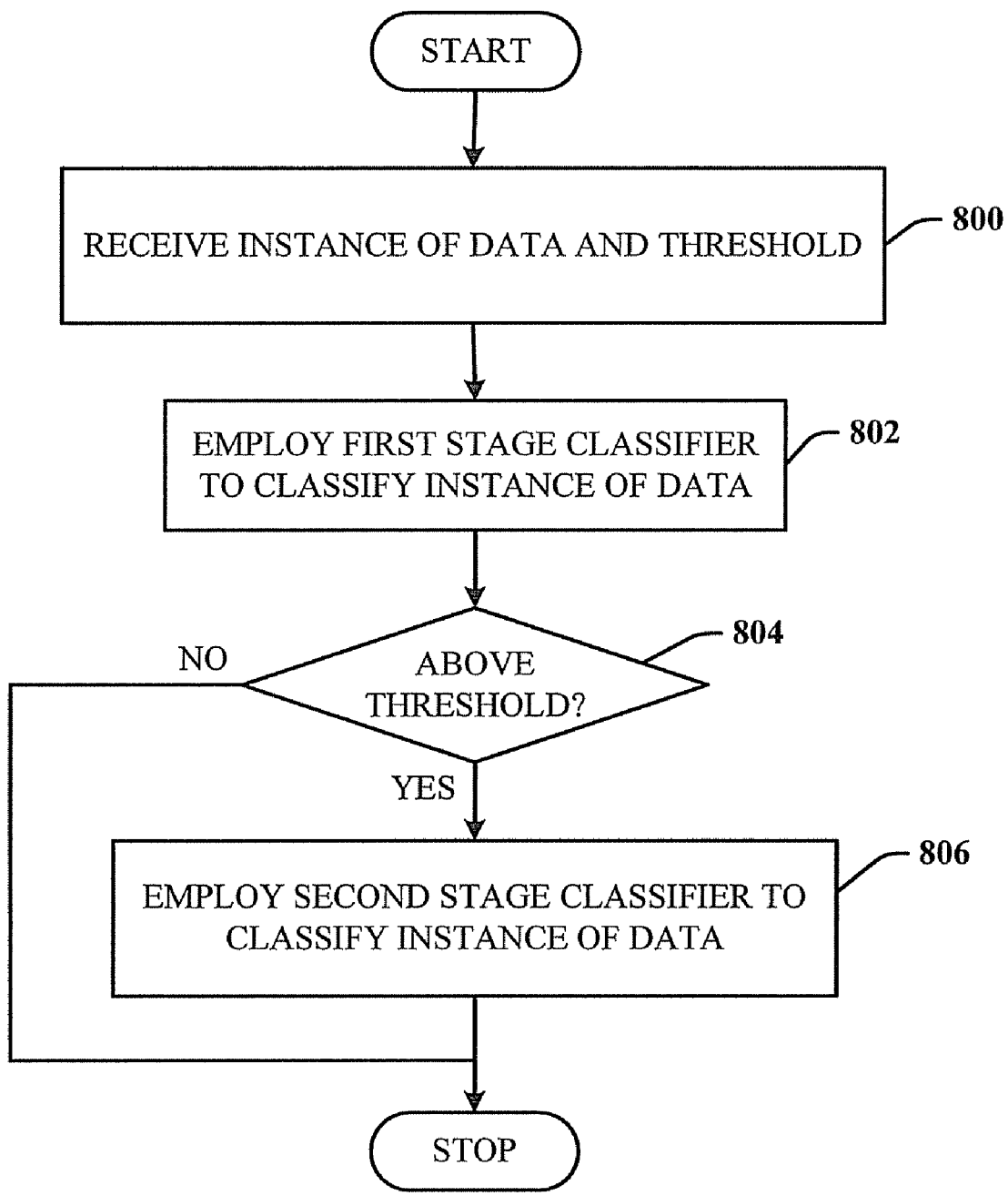
FIG. 8 illustrates a flow chart of one methodology of classifying an instance of data with a multi-stage classifier.

Turning to FIG. 8, there is illustrated a flow chart of one methodology of classifying an instance of data with a multi-stage classifier. At 800, an instance of data and threshold are received. The instance of data and/or threshold can, but is not limited to, being generated from an application, manually input, loaded from a data store, and/or received from another system locally or remotely. At 802, the first stage classifier is employed to classify the instance data. At 804, a determination is made; if the classification value for the instance of data from the first stage classifier is below a defined threshold, then output the classification value from the first stage classifier, otherwise, proceed to 806. At 806, the instance of data is classified using a second stage classifier and the classification value from the second stage classifier is output. The classified instance of data can, but is not limited to, being saved to one or more data stores, displayed on one or more displays, transmitted to one or more local or remote systems, and/or executed by one or more processors on one or more systems.

Figure 9:
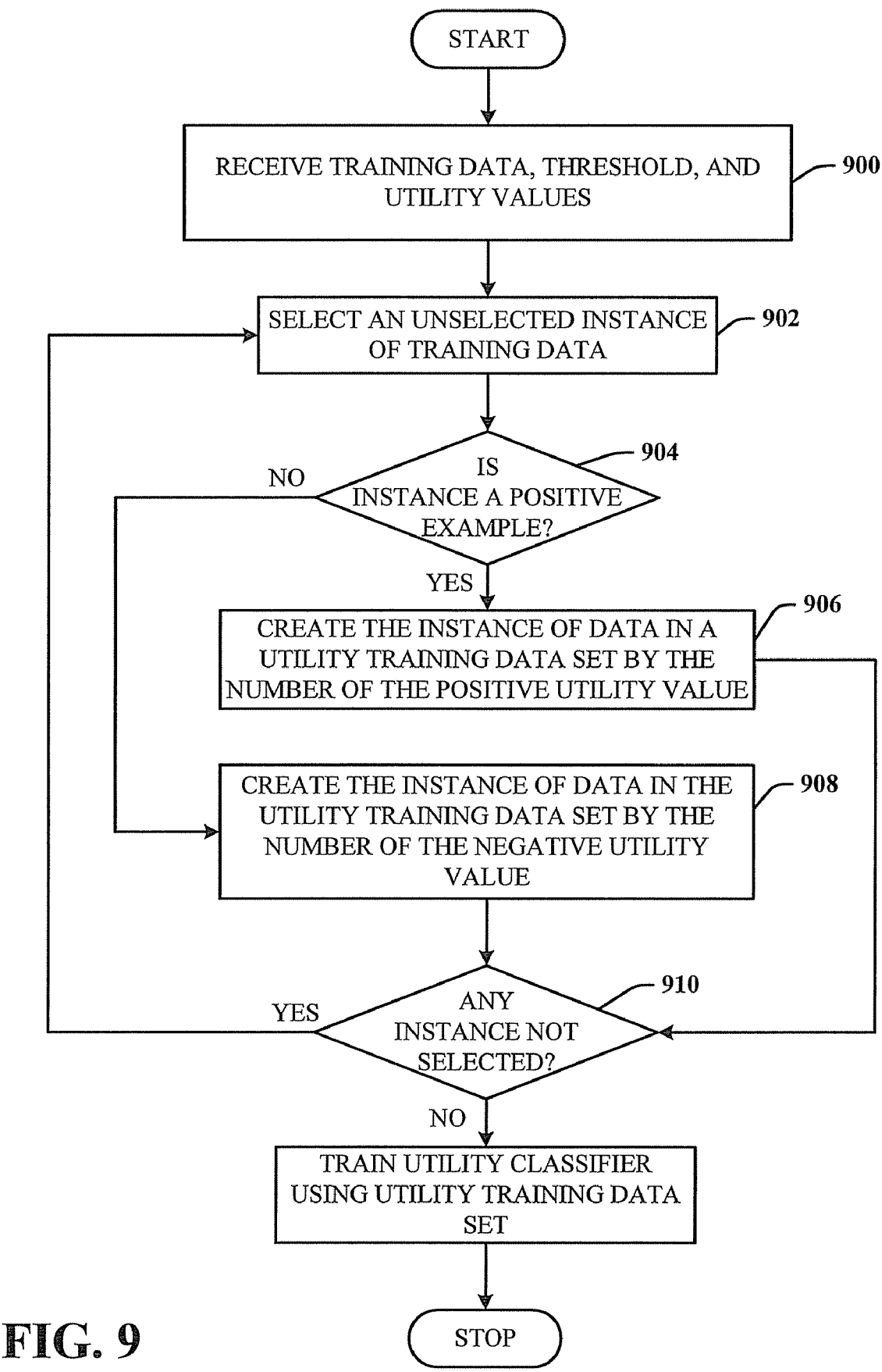
FIG. 9 illustrates a flow chart of one methodology for training a utility classifier.

Referring to FIG. 9, there is illustrated a flow chart of one methodology for training a utility classifier. At 900, training data, positive utility value, negative utility value, and threshold are received. The training data, positive utility value, negative utility value, and/or threshold can, but is not limited to, being generated from an application, manually input, loaded from a data store, and/or received from another system locally or remotely. At 902, one instance of data is selected from the training data that has not been previously selected. At 904, a determination is made; if the instance of data is a positive example proceed to 906, otherwise proceed to 908. This information is provided for each instance of data as part of the training data. At 906, create a number of duplicate instances of the instance of data, where the number is equal to the positive utility value, and add the newly created duplicate instances of data to a set of utility training data. At 908, create a number of duplicate instances of the instance of data, where the number is equal to the negative utility value, and add the newly created duplicate instances of data to a set of utility training data. At 910, a determination is made; if there is an instance of data in the training data that has not been selected, then proceed to 902, otherwise proceed to 912. At 912, a utility classifier is trained using the set of utility training data.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one-step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors that the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) can be derived from another class (called a base class, parent class, etc.), where the subclass inherits the data attributes and methods of the base class. The subclass can specialize the base class by adding code which overrides the data and/or methods of the base class, or which adds new data attributes and methods. Thus, inheritance represents a mechanism by which abstractions are made increasingly concrete as subclasses are created for greater levels of specialization.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter can be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 10:
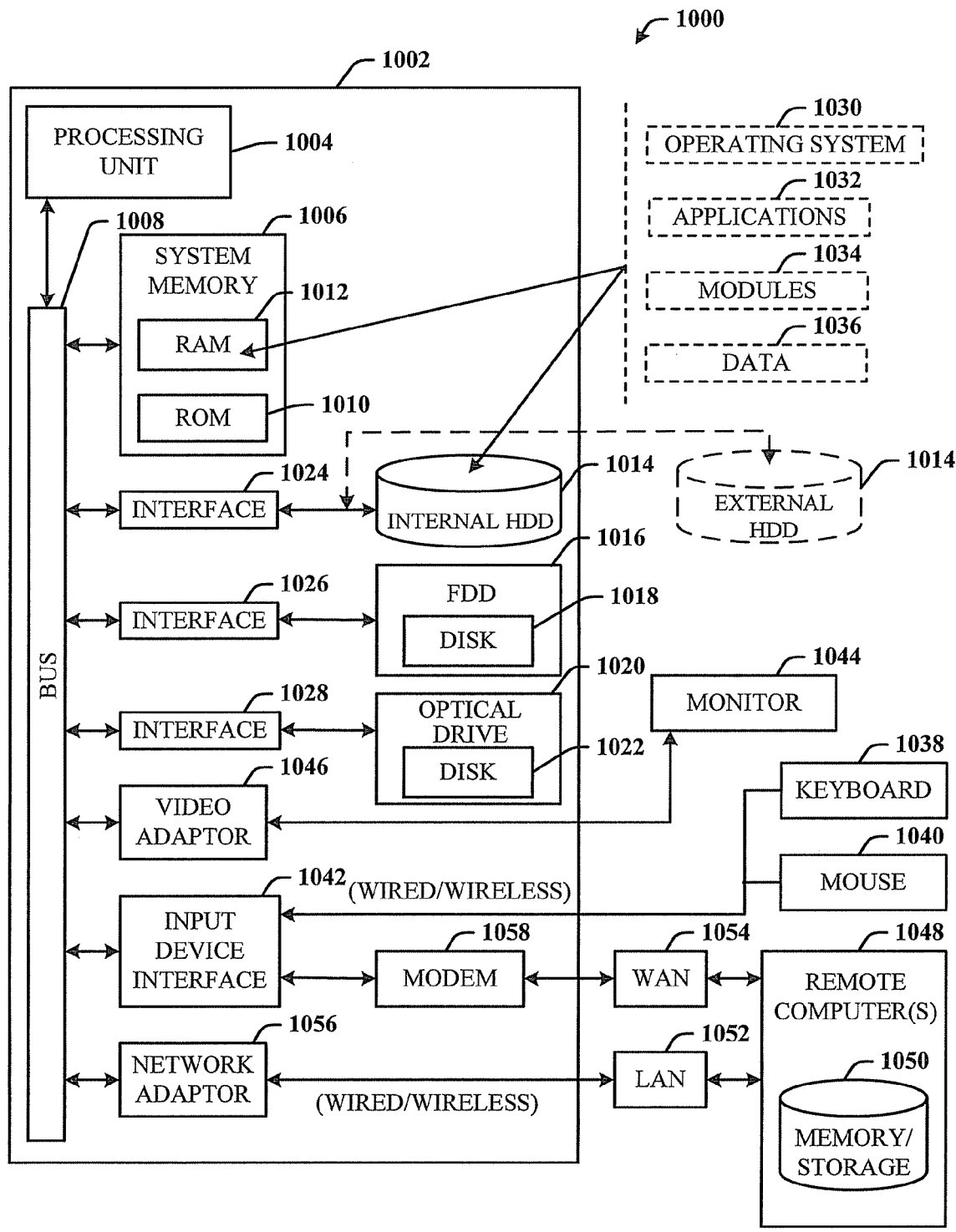
FIG. 10 illustrates a block diagram of a computer operable to execute the disclosed multi-stage classifier for classification of data.

Referring now to FIG. 10, there is illustrated a block diagram of a computer operable to execute the disclosed system. In order to provide additional context for various aspects thereof, FIG. 10 and the following discussion are intended to provide a brief, general description of a suitable computing environment 1000 in which the various aspects of the claimed subject matter can be implemented. While the description above is in the general context of computer-executable instructions that can run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary environment 1000 for implementing various aspects includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the claimed subject matter.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the disclosed and claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the claimed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adaptor 1056 can facilitate wired or wireless communication to the LAN 1052, which can also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11 a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+Mbps in the 2.4 GHz band. Products can contain more than one band (e.g., dual band), so the networks can provide real-world performance similar to the basic 10BaseT wired Ethernet networks used in many offices.

Figure 11:
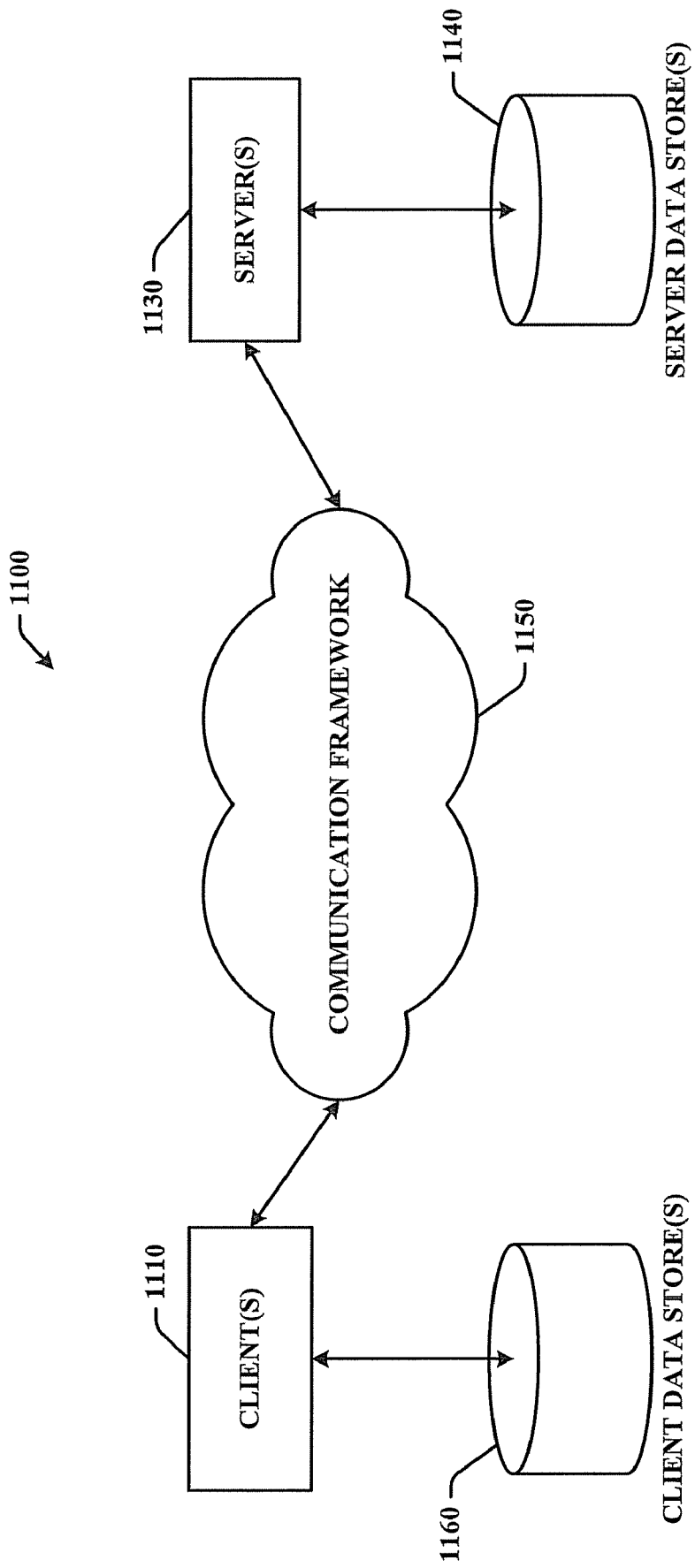
FIG. 11 illustrates a schematic block diagram of an exemplary computing environment for processing multi-stage classifier for classification of data in accordance with another aspect.

Referring now to FIG. 11, there is illustrated a schematic block diagram of an exemplary computing environment 1100 for processing the inference-based query completion architecture in accordance with another aspect. The system 1100 includes one or more client(s) 1102. The client(s) 1102 can be hardware and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet can include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

EXPERIMENTAL RESULTS

For a practical research topic like anti-spam, it is best to evaluate techniques in a realistic setting. Fortunately, we have access to the Hotmail Feedback Loop data, which is collected by polling over 100,000 Hotmail volunteers daily. In this feedback loop, each user is provided with a special copy of a message that was addressed to him, and is then asked to hand-label this message as Good or Spam. The original copy of the message might have been deleted, or been put in the junk folder, or might be in the user's inbox already: this is an additional copy. By asking users to label their own messages, we believe we get judgments that only they can make, across many languages, and with an up-to-date data source. Analyzing this data, we find that very roughly 3% of user labels are errors. In some cases, we can be sure that a message is labeled in error. Examples include messages labeled as good that are really virus or phishing messages, or a message from an amorous young woman that appears to be specially sent to the recipient, but is in fact sent to many thousands of people. In other cases, it is extremely difficult to tell whether a user has made an error or not. We might find for an identical message that 20% or 50% or 80% of users labeled it as spam, while the others considered it good. Unfortunately, there is often no way to know whether some of these users made a mistake or got tricked, or some users were spammed while others opted in for the same content (e.g. a newsletter).

For the experiments in this discussion, the training data are messages received between Jul. 1, 2005 and Nov. 30, 2005. We randomly picked 5,000 messages from each day and the total number of messages for training is 765,000. Similarly, the testing data is taken randomly from messages received between Dec. 1, 2005 and Dec. 15, 2005. 10,000 messages were drawn from each day, which constructs a collection of 150,000 testing messages. From each message, we extracted features consisting of subject keywords and body keywords that occurred at least three times in the training set. This is a subset of the usual features we use, which also includes many proprietary features; we used this subset in the experimental results describe here to make it easier to replicate our results; results trained with our full feature set show similar improvements.

Note that the results reported here are quite a bit worse than our true performance in commercial applications for a number of reasons. First, the machine learning system we describe here is only one component of a larger system that also uses other techniques, such as IP blocklists, IP safelists like Bonded Sender', user supplied safelists, etc. Second, in order to make the experiments more replicable, we chose to use a subset of our full feature set, only subject and body features, rather than including other proprietary features. Third, in order to simplify the experiments, we used somewhat less training data—765,000 messages—than we use commercially, although this is still almost an order of magnitude larger than any publicly available spam collection. Fourth, most "errors" at a false positive rate of 3% or below turn out not to be spam filter errors, but instead are labeling errors. As mentioned above, we find that users typically make approximately 3% labeling errors, so most "false positives" at a 3% error rate or below are not errors at all. Real errors that we do find at low false positive rates are only very rarely personal mail from one user to another; more typically they are legitimate advertisements that users may be just as happy to have in their junk folder. The false positive rates in the results below may seem surprisingly high, but the regions displayed in the charts below do correspond to real regions of interest for this particular component of the larger system, especially at the "junk folder" threshold—that is, for messages that are put into a junk folder, rather than deleted outright. Of course, when combined with other techniques, including user-supplied safelists and global IP safelists, and with our full training set and features, actual false positive rates are substantially lower.

We evaluated our methods with two different learners—logistic regression and Naive Bayes. For each of the learning algorithms, we tested four cases: original, which uses just the baseline learning algorithm; utility, which weights negative examples (good mail) as 10 times more important than the positive examples (spam); 2-stage, where the threshold is picked at roughly the 0.2 false positive rate; and utility and 2-stage, which is the method that combines both utility and 2-stage methods. The performance in ROC curves is shown in FIG. 12 and FIG. 13, where each point of a given curve corresponds to a different threshold value.

As can be seen in the figures, both the utility and 2-stage methods are consistently better than the original approach for this data set. Also shown in FIG. 12, the utility method and the 2-stage method perform fairly closely, and indeed cross. The utility method is slightly better for higher false positive rates, while the 2-stage method is better at the lowest false positive rates. Their false negative reduction rates compared to the original curve are about 18%. The combined approach works better than either method separately: its false negative reduction rate is a little more than 20% and its performance roughly matches the 2-stage method when the false positive rate is below 0.06.

Results are similar for Naive Bayes, although the improvements are even larger. As shown in FIG. 13, when using Naive Bayes, the 2-stage method is consistently more effective than the utility method. Compared to the original curve, the relative false negative rate reduction for the 2-stage method is about 25% in this ROC region, while the utility method has roughly a 10% false negative reduction rate. The effect of combining these two approaches is in general better than each individual approach. When applied on Naive Bayes, the combined reduction rate can be as high as 40% relative compared to the original curve in some regions. However, when the false positive rate is lower than 0.06, the advantages of combination vanish, and the 2-stage method alone is better.

Figure 12:
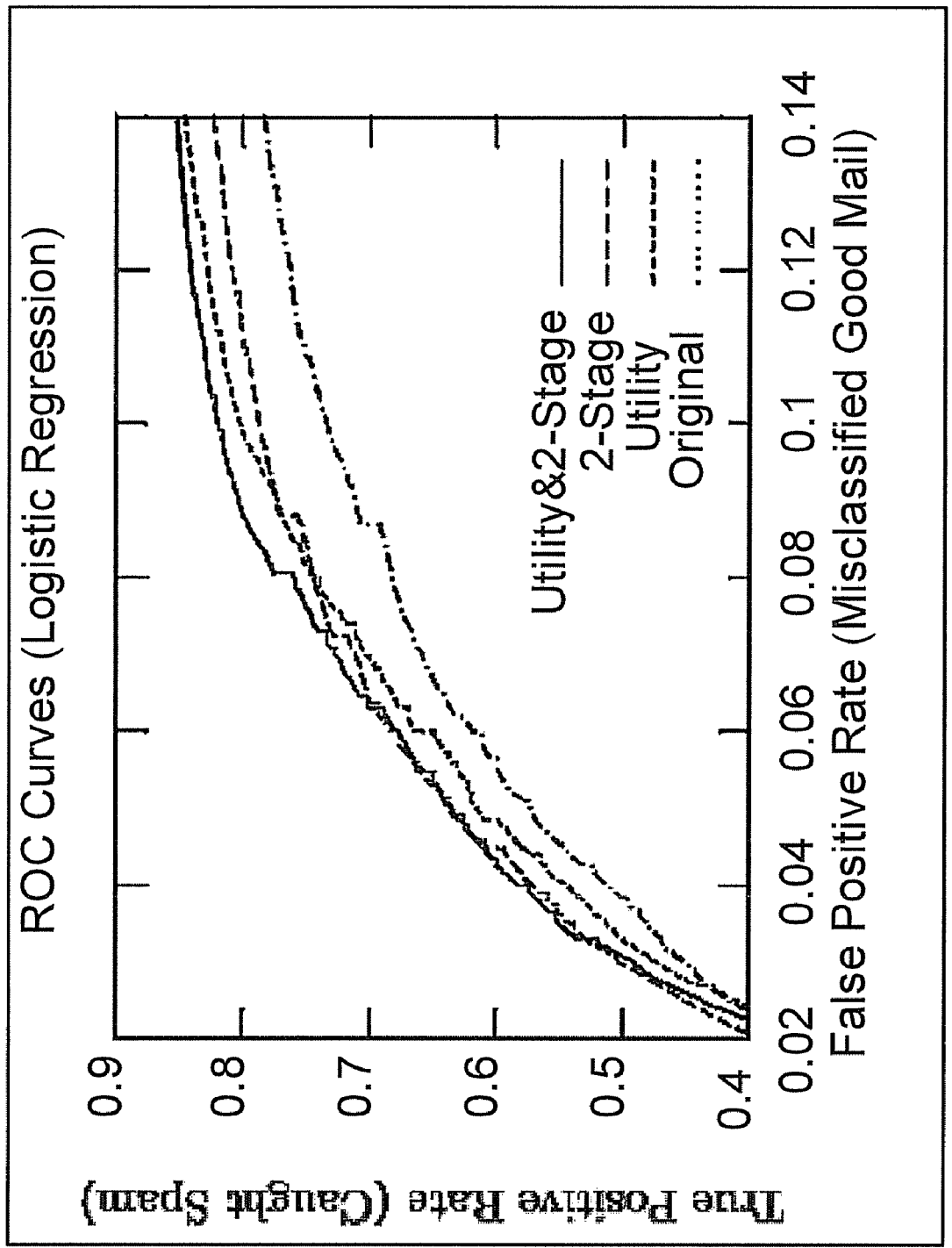
FIG. 12 illustrates performance in terms of ROC curves for logistic regression based upon different training methods.
Figure 13:
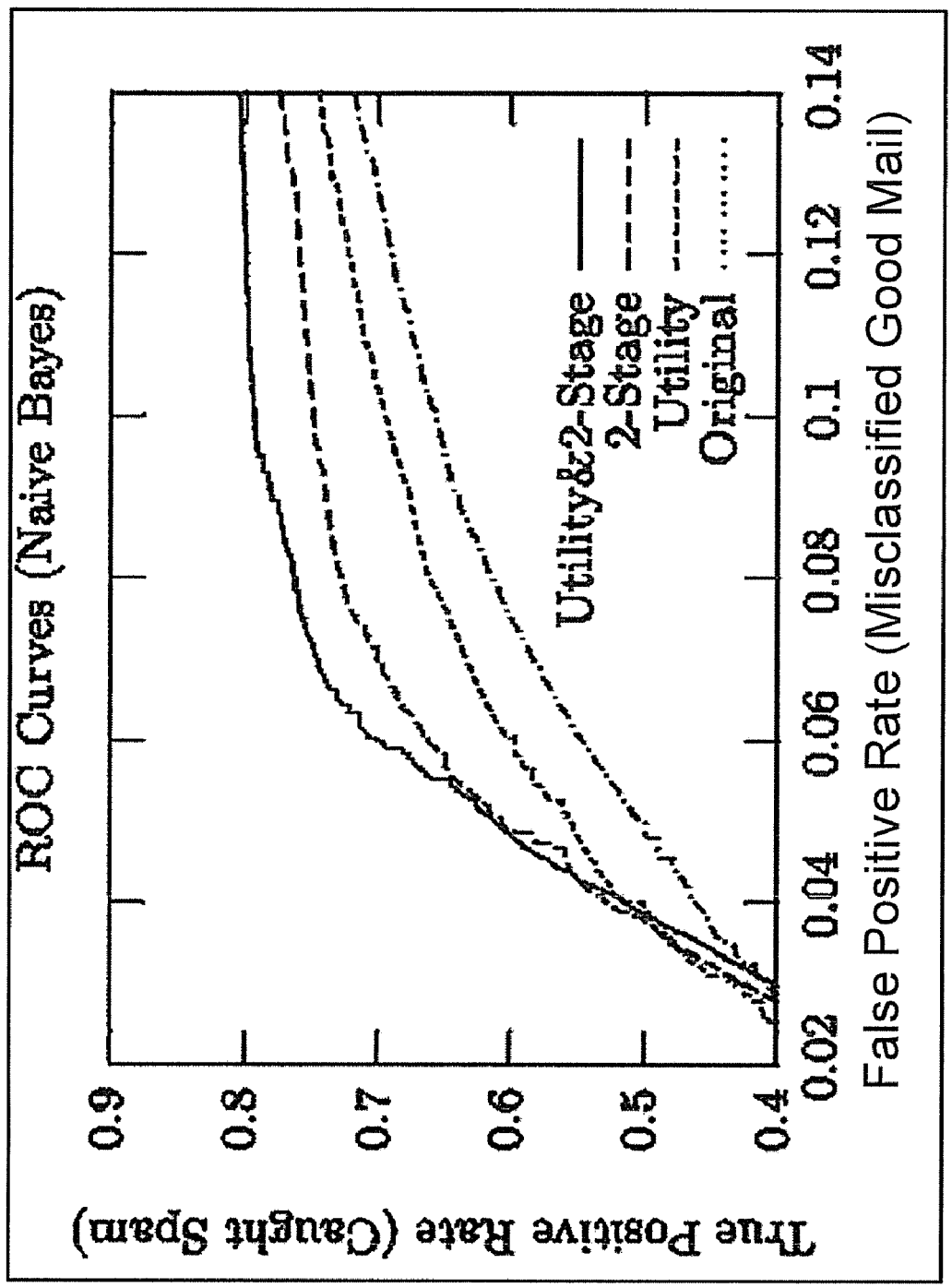
FIG. 13 illustrates performance in terms of ROC curves for Naïve Bayes based upon different training methods.

It is also interesting to compare FIG. 12 and FIG. 13. Here, we see that unsurprisingly, filters trained based on logistic regression are substantially better than those trained on Naive Bayes. However, the performance gap shrinks after the two-stage and utility methods are applied. Depending on which false positive rate point we pick, the combined approach on Naive Bayes can be competitive with the combined approach on logistic regression, and can outperform the original logistic regression learner.

In the two-stage approach, the two classifiers are trained using the same feature set but with different examples. It is therefore interesting to see how the same features are treated differently by these two classifiers. In particular, we would like to find features that change weight substantially from the first stage to the second stage, to understand better why the 2-stage approach helps.

We examined the weights of the first-stage and the second-stage classifiers learned with 2-stage logistic regression, and found that some features are treated very differently. For example, words like unsubscribe and click are considered more indicative of spam by the first-stage classifier. One possible reason might be that both spam messages and commercial newsletters often contain these words. A message without these words seems more like a legitimate message. However, to the second-stage classifier, these words may not be as informative as in the first-stage. Other features that are more helpful to distinguish spam and spam-like good mail will have higher weights in the second stage.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for classification of data using a multi-stage stage classifier comprising: training a first stage classifier of the multi-stage classifier with an entire set of training data classifying each of instance of training data in the set of training by employing the first stage classifier; adding each instance of the training data that has been classified by the first stage classifier to have a classification value within a predefined threshold range into a set of second stage training data; and training a second stage classifier of the multi-stage classifier with the entire set of second stage training data; storing the multi-stage classifier on a computer readable storage medium.

2. The method of claim 1, wherein adding each instance of the training data that has been classified by the first stage classifier to have a classification value above a predefined threshold into a set of second stage training data comprises:
   splitting the set of training data into disjoint subsets of training data;
   adding instances of training data to a set of second stage training data by iteratively performing the following acts on each subset of training data:
     training a subset classifier associated with a subset of training data by using all of the instances of training data except the instances of training data within the subset of training data;
     applying the subset classifier on the subset of training data;
     adding each instance of data from the subset of training data that has been classified with a classification value within a predefined threshold range by the subset classifier to a set of second stage training data.

3. The method of claim 2, wherein the classification value is a probability.

4. The method of claim 1, wherein the features of the training data used by the first stage classifier for classification and the features of the training data used by second stage classifier for classification are identical.

5. The method of claim 1, wherein the threshold is defined based on a desired false positive rate or a desired false negative rate.

6. The method of claim 1, wherein instances of training data are duplicated according to defined utility values associated with each instance.

7. The method of claim 1, wherein at least one of the first stage classifier or second stage classifier is modified according to defined utility values.

8. The method of claim 1, classifying an instance of unclassified data by employing the multi-stage classifier by:
   producing a classification value for the instance of unclassified data by employing the first stage classifier;
   outputting the classification value produced by the first stage classifier if the classification value produced by the first stage classifier is below a predefined threshold; and
   producing a classification value for the instance of unclassified data by employing the second stage classifier and outputting the classification value produced by the second stage classifier if the classification value produced by the first stage classifier is not below the predefined threshold.

9. The method of claim 1, wherein the set of training data comprises a plurality of e-mail, each e-mail is labeled as spam or non-spam.

10. The method of claim 1, wherein the set of training data comprises at least one of fraud detection data, intrusion detection data, patient diagnostic data, biometric data, incoming phone call data, audio data, video data, document data, web page data, pop-up window data, or image data.

11. The method of claim 1, wherein there are more than two classes and a threshold range is defined for each class.

12. A system for classification of classification of data, comprising:
   a set of training data containing a plurality of instances of training data;
   a multi-stage classifier component that has at least a first stage classifier and second stage classifier, wherein cross validation of the training data with respect to a predefined threshold is employed by the multi-stage classifier component to produce a set of second stage training data.

13. The system of claim 12, wherein the first stage classifier is trained using the entire set of training data and the second stage classifier is trained using the entire set of second stage training data.

14. The system of claim 12, wherein the multi-stage classifier component is trained with utility.

15. The system of claim 12, wherein the set of training data comprises at least one of fraud detection data, intrusion detection data, medical diagnostic data, biometric data, incoming phone call data, audio data, video data, document data, web page data, pop-up window data, or image data.

16. The system of claim 12, further comprising an instance of unclassified data that is classified by the multi-stage classifier component, wherein the multi-stage classifier component outputs classification value from the first stage classifier's classification of the instance of data if the classification value is below the threshold, otherwise the multi-stage classifier component outputs the classification value from the second stage classifiers classification of the instance of data.

17. The system of claim 12, wherein the threshold is defined based on a desired false positive rate or a desired false negative rate.

18. A system for classification of classification of data, comprising:
   one or more instances of data;
   a multi-stage classifier component that has at least a first stage classifier and a second stage classifier, wherein the multi-stage classifier classifies at least one of the one or more instances of data by outputting the classification value from the first stage classifier's classification of the at least one instance of data if the classification value is within a threshold range, otherwise the multi-stage classifier component outputs the classification value from the second stage classifiers classification of the at least one instance of data.

19. The system of claim 18, wherein the features employed for classification by the first stage classifier and the second stage classifier are identical.

20. The system of claim 18, wherein the at least one or more instances of data comprise at least one of fraud detection data, intrusion detection data, or email labeled as spam or not spam.

* * * * *